(12) United States Patent  
Van Houten et al.

(10) Patent No.: US 7,004,549 B2  
(45) Date of Patent: Feb. 28, 2006

(54) WHEEL COVER RETENTION APPARATUS

(75) Inventors: Garry Van Houten, Middleville, MI (US); Lawrence E. O'Toole, Highland, MI (US)

(73) Assignee: Lacks Industries, Inc., Grand Rapids, MI (US)

( * ) Notice: Subject to any disclaimer, the term of this patent is extended or adjusted under 35 U.S.C. 154(b) by 0 days.

(21) Appl. No.: 10/725,716

(22) Filed: Dec. 2, 2003

(65) Prior Publication Data

US 2004/0135423 A1    Jul. 15, 2004

Related U.S. Application Data

(63) Continuation of application No. 10/253,749, filed on Sep. 24, 2002, now Pat. No. 6,682,151.

(51) Int. Cl.
*B60B 7/14* (2006.01)
(52) U.S. Cl. .................... 301/37.372; 301/37.373; 301/37.42
(58) Field of Classification Search ............ 301/37.23, 301/37.31, 37.32, 37.33, 37.34, 37.373, 37.372, 301/37.374, 37.375, 37.376, 37.42, 35, 36
See application file for complete search history.

(56) References Cited

U.S. PATENT DOCUMENTS

| | | | | |
|---|---|---|---|---|
| 5,163,739 A | * | 11/1992 | Stanlake | 301/37.373 |
| 5,297,854 A | * | 3/1994 | Nielsen et al. | 301/37.373 |
| 6,402,254 B1 | * | 6/2002 | Eikhoff et al. | 301/37.373 |
| 6,726,290 B1 | * | 4/2004 | Yue | 301/37.23 |

* cited by examiner

*Primary Examiner*—Frantz F. Jules
(74) *Attorney, Agent, or Firm*—VanOphem & VanOphem, P.C.

(57) ABSTRACT

An ornamental wheel cover integrally retained on the lug nuts of a vehicle wheel that provides positive positioning of the cover to the lug nuts. The cover is provided with a number of elongated tubular extensions axially projecting therefrom that are each partially slotted to provide a plurality of cantilevered fingers. Each finger has an undercut groove that positively positions the cover to the lug nuts of the wheel. When the cover is attached to the wheel, the elongated tubular extensions are aligned with the lug nuts and the cover is moved axially inwardly of the wheel so that the cantilevered fingers separate slightly as they pass over the flange of the lug nut. The wheel cover further includes a wire band retainer to bias the innermost cantilevered fingers into continual engagement with the lug nuts, even during temperatures that would otherwise cause the plastic to distort due to heat creep.

4 Claims, 4 Drawing Sheets

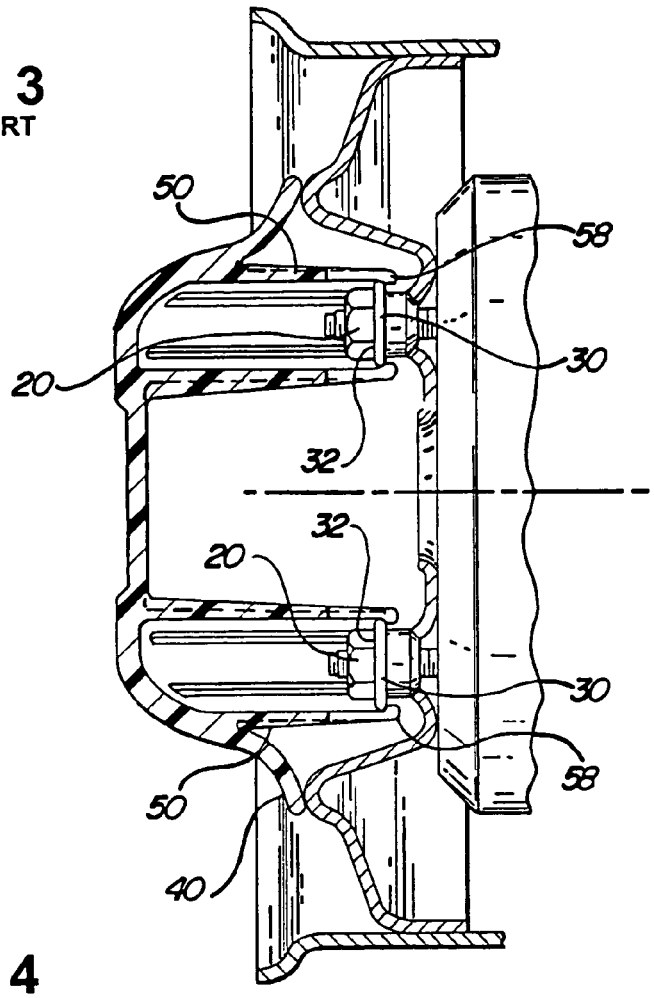
FIG - 3
PRIOR ART
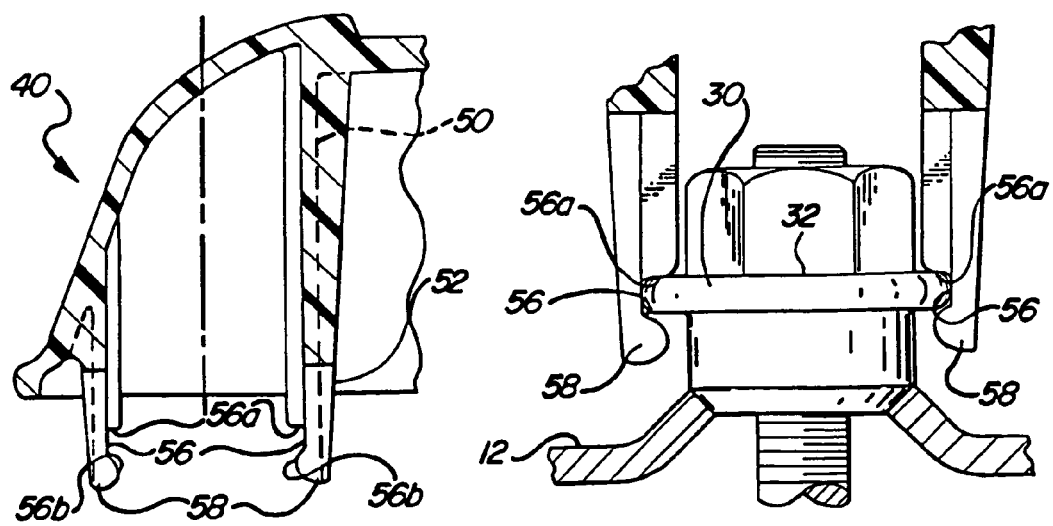
FIG - 4
PRIOR ART
FIG - 5
PRIOR ART

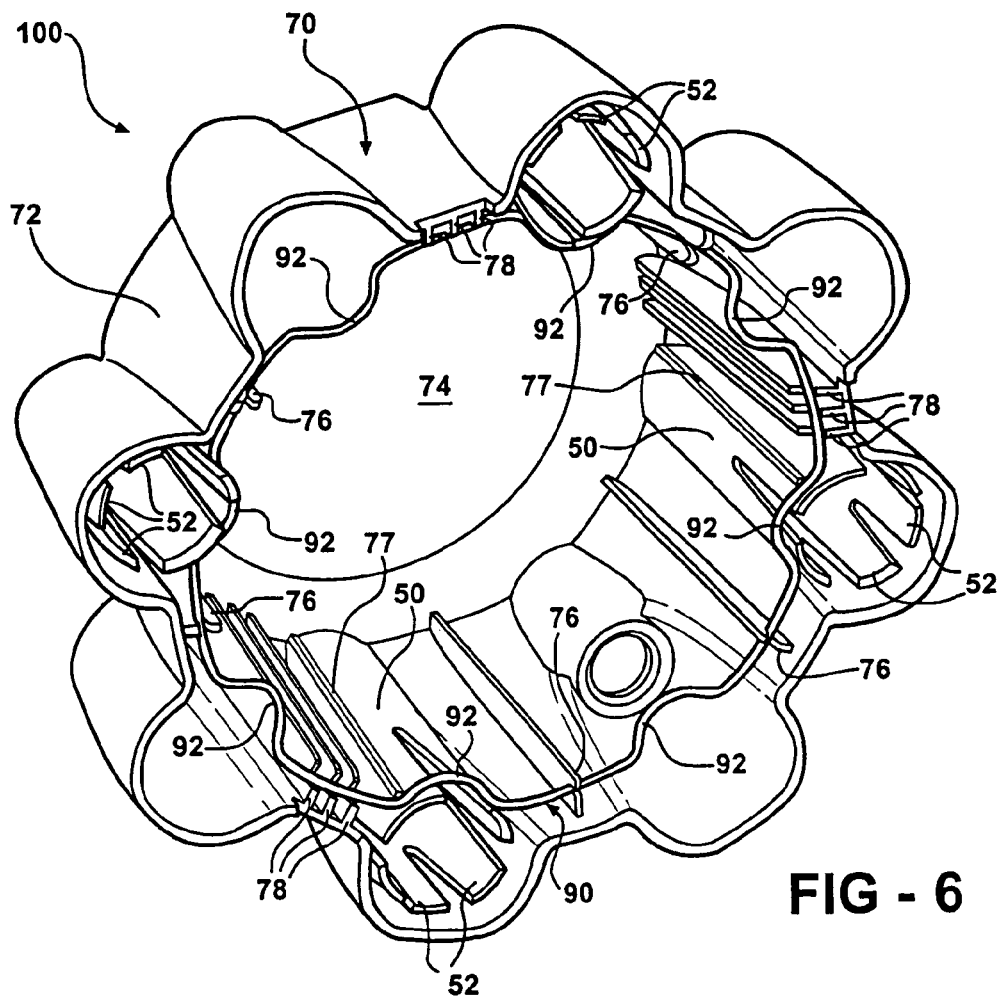
FIG - 6
FIG - 9
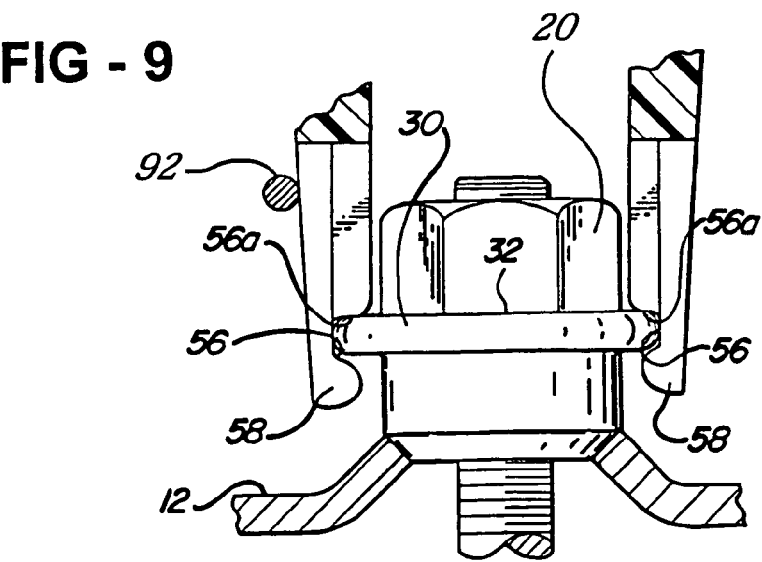

WHEEL COVER RETENTION APPARATUS

CROSS-REFERENCE TO RELATED APPLICATIONS

This application is a continuation application of U.S. patent application Ser. No. 10/253,749, filed on Sep. 24, 2002, now U.S. Pat. No. 6,682,151 B1 issued on Jan. 27, 2004.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to plastic wheel covers with integral retention systems. More specifically, this invention is directed to an ornamental wheel cover that is easily attachable and removable, that is inexpensive, and that has a wire retention device to provide improved wheel cover retention.

2. Description of the Related Art

Related art references have suggested various methods and apparatuses for removably attaching a wheel cover to a wheel. For example, U.S. Pat. No. 4,123,111 to Renz et al. discloses a retaining cover that is provided circumferentially in the engaging plane of the lug nuts with detents to engage the outer periphery of the lug nuts. The retaining cover has a shape that differs from the circular shape of the wheel cover exhibiting a relatively large lever arm between the connecting lines of the points of engagement of the lug nuts, thereby reducing the spring rate. The lug nuts are seated in recesses in the peripheral edge of the retaining cover. The edge of the retaining cover snaps in within the area of the recesses. To cover the lug nuts a wheel cover cap is provided that is mounted over the retaining cover.

Several problems exist with the Renz et al. device. Plastic is a relatively low strength material which tends to relax and/or creep over time and with temperature. Therefore, removal and replacement of the retaining cover could lead to loss of retention of the retaining cover to the lug nuts. The retaining cover is subject to stress and flexing in an area that is recessed and has a much thinner material thickness than the surrounding area of the cover, thereby making it subject to cracking. Thermal expansion rates between the steel lug nut and plastic cover differ aggravating the above stated problems. Further, the fact that Renz et al. require a relatively large lever arm between the connecting points of engagement and the detent points in order to reduce the spring rate, it would not be possible to obtain this arrangement with shallow profile wheel covers. Further, the two-piece assembly provides large cavities between the retaining cover and the outer wheel cover in which mud and road debris can collect over time.

U.S. Pat. No. 4,382,635 to Brown et al. attempts to overcome some of these problems by disclosing a wheel cover with integral retention fingers which is useable on conventional steel wheels. The cover is integrally retained on the wheel by the cooperating inter-engagement of tubular extensions of the cover mounting to the lug nuts. The extensions are axially slotted so as to be divided into a plurality of cantilevered fingers which cooperate with the lug nuts to retain the wheel cover thereto. The fingers of each extension include integral radially extending abutments which resiliently engage within a radial opening groove of a respective lug nut to resiliently grip the nut and retain the cover thereto. Concurrent with receipt of the abutments in the groove, a tapered radial face on each finger engages an axially outwardly extending annular face of the apertured embossment in an attempt to provide a slight axial outward force on each finger to prevent axial shifting movement of the extensions relative to the lug nuts.

The abutments describe a circle which is slightly less than the circle of the hexagonal portion of the lug nuts so that the fingers slightly separate or flex axially outwardly as the abutments move over the hexagonal portion of the lug nuts. Therefore, the fingers separate as the abutments move over an annular rib of the lug nuts until the abutments snap into the circumferential groove in each respective lug nut. When the abutments are received in the groove, the fingers return substantially to their normal position. A radial tapered face of each abutment engages an axially outwardly extending annular face of the wheel surface to provide a slight axial outward force on each extension to prevent axial shifting movement of the extensions relative to the lug nuts.

One of several problems associated with this design is the adverse effects of tolerance stack-ups between the axially outwardly extending annular face and the location of the groove on the lug nut. The fit of the cover to the lug nut depends on the depth and width of a groove that is on the lug nut and a tapered surface on the wheel face next to where the lug nut is seated. The tolerance build up among the radial tapered extension on the end of each finger of the cover, the lug nut, and the taper on the wheel's surface results in groove width variations that will prevent the radial tapered face of the abutment to move to the bottom of the groove, resulting in a loose fit on the lug nut and a stress condition in the fingers of the retainer, thereby subjecting the retainer to the previously described problems regarding the use of plastic.

Another problem associated with the lack of positive positioning in the Brown design is the potential for improper installation. It is possible, during attachment of the cover to the wheel, to apply a force that causes the cover to overtravel and press the fingers against the tapered wheel surface which in turn opens up the fingers, forcing them out of the groove and causing them to travel along the tapered wheel surface, which results in a loose fit.

Yet another drawback of the Brown design is a potential problem with the location of the circumferential groove on the lug nut and improper torque on aluminum wheels. It is known in the art that in order to achieve proper torque on the lug nuts for aluminum wheels, the conical seat must be deeper, providing more surface area contact with the wheel surface than required for steel wheels. The groove in the lug nut of the Brown design will prevent the lug nut from seating properly on an aluminum wheel by presenting less surface area contact with the aluminum wheel and thereby making it a problem to achieve sufficient torque for an aluminum wheel. In other words, the lug nut in the Brown design is not compatible with both steel and aluminum wheels.

As a solution to some of the above disadvantages, U.S. Pat. No. 5,163,739 to Stanlake teaches a wheel cover that includes a plurality of integral tubular extensions for attaching the wheel cover to the lug nuts of the wheel. Each tubular extension has a plurality of slots extending axially from the wheel cover wherein the slots define a plurality of fingers that axially engage an annular rib of a respective lug nut. The fingers include an undercut portion to accommodate a one-piece wire band retainer having a plurality of circumferentially expanding rings and a plurality of concave bends. Alternatively, a split ring wire retainer may also be used.

The wire band retainer is pushed onto the integral tubular extensions such that the fingers flex radially inward and the circumference of the rings increase to encircle the fingers of the extensions and be received by the undercuts. The increase in the circumference of the rings is facilitated by the concave bends of the retainer flexing to a straightened position. Accordingly, Stanlake teaches a retention apparatus whereby the tubular extensions of the wheel cover are completely encircled by the wire band retainer to limit the outward radial movement of the flexible fingers and to bias the flexible fingers into engagement with the lug nuts.

While the incorporation of the wire retainer addresses some of the problems associated with conventional plastic wheel covers, there are several difficulties with the Stanlake invention. The wheel cover taught by Stanlake can only be removed from the wheel by first removing the lug nuts which is a difficult and time consuming process as compared with conventional snap-fit plastic wheel covers. Furthermore, the wheel cover is limited to wheel applications in which it is desirable to have exposed lug nuts as access thereto is essential. Finally, the configuration taught by Stanlake, in which a one-piece wire band retainer encircles the perimeter formed collectively by the lug nuts, encircles each lug nut individually, and provides for a plurality of concave bends requires excessive wire material thereby incurring unnecessary material cost.

Because of the various problems identified with prior art retention systems, there is a need for a wheel cover having an integral fastening system that provides positive positioning of the cover relative to the wheel thereby eliminating the effects of tolerance stack-ups and the possibility of overtravel that result in poor fit of the cover to the wheel. There is also a need for a decorative wheel cover that is capable of covering the central portion of a wheel, including the lug nuts, that is easily attachable and removable, that maintains retention in high temperature environments, and that maintains retention after repeated attachment and removal. The cover attachment must not affect the lug nut torque or the contact interface between the lug nut and the wheel surface area so that a standard lug nut can be used for both aluminum and steel wheels.

BRIEF SUMMARY OF THE INVENTION

According to the preferred embodiment of the present invention, there is provided an ornamental wheel cover assembly integrally retained on the lug nuts of a vehicle wheel. The lug nuts preferably have a flange that defines an upper shoulder. The wheel cover assembly includes a wheel cover and a wire band retainer. The wheel cover includes a front face having visible decorative features and a rear face. The rear face of the wheel cover has a plurality of elongated tubular extensions axially projecting therefrom, and a plurality of support features disposed between the elongated tubular extensions.

The elongated tubular extensions are slotted to provide a plurality of cantilevered fingers. Each cantilevered finger terminates with a bulbous portion to provide snap fit engagement of the wheel cover assembly to the lug nuts whereby the wheel cover is easily attachable and removable. The cantilevered fingers further include an undercut groove adapted to engage the upper shoulder of the lug nut flange and thereby positively position the wheel cover assembly to the lug nuts.

The wire band retainer is generally circular and has a plurality of concave sections. The plurality of support features locate and retain the wire band retainer within the wheel cover, on the inner diameter of the circle having a perimeter defined by the tubular extensions collectively. The plurality of concave sections are designed to support a portion of the tubular extensions to bias and maintain the corresponding cantilevered tapered fingers into engagement with the lug nuts.

When the wheel cover assembly is attached to the wheel, the elongated tubular extensions are aligned with the lug nuts and the cover is moved axially inwardly of the wheel so that the cantilevered fingers separate slightly as they pass over the flange of the lug nut. Additionally, as the wheel cover is attached to the wheel, the flexible fingers in contact with the wire band retainer act to deform the wire band in a direction toward the center of the wheel cover while the bulbous portion of the finger pass over the flange of the lug nuts, and thereafter the wire band retainer biases the innermost fingers into engagement with a respective lug nut.

As is well known in the art, metal is generally less prone to relaxation and/or creep over time and with temperature as compared to plastic. The wheel cover assembly described herein incorporates the metallic wire band retainer to improve resistance to creep, relaxation and high temperature effects. Furthermore, the bulbous portion of each finger is configured such that the wheel cover is snap-fit attachable and similarly removable. As the wire band retainer of the present invention does not encircle the cantilevered fingers, the wheel cover can quickly and easily be removed from the wheel without removing each lug nut.

It is an object of the present invention to provide a decorative wheel cover assembly for covering the lug nuts and the central portion of the wheel.

It is another object that such a wheel cover assembly is adapted to incorporate a snap-fit engagement device such that the wheel cover is both easily attachable and removable.

It is still another object that such a wheel cover assembly is configured to maintain engagement with a wheel when subjected to a high temperature environment.

It is yet another object to provide a wheel cover that is subject to creep or thermally excessive environments where a retainer is used that maintains some of the fingers biased to prevent the cover from separating from the lug nuts.

It is a further object to provide a wheel cover that is capable of maintaining engagement with a wheel after being repeatedly attached to and removed from a wheel.

It is still a further object to provide a wheel cover that is inexpensive to manufacture and assemble.

These objects and other features, aspects, and advantages of this invention will be more apparent after a reading of the following detailed description, appended claims, and accompanying drawings.

BRIEF DESCRIPTION OF THE SEVERAL VIEWS OF THE DRAWINGS

FIG. 3 is a sectional view of FIG. 2 including the prior art wheel cover of FIG. 1;

FIG. 4 is a sectional view of an elongated tubular extension of the prior art wheel cover of FIG. 1, prior to attachment to one of the lug nuts of FIG. 2;

FIG. 5 is an enlarged sectional view of the prior art elongated tubular extension of FIG. 4 shown attached to one of the lug nuts of FIG. 2;

FIG. 6 is a perspective of the wheel cover assembly according to the present invention;

FIG. 9 is an enlarged sectional view of an elongated tubular extension of FIG. 6 and the wire band retainer of FIG. 7 attached to a lug nut.

DETAILED DESCRIPTION OF THE PREFERRED EMBODIMENT

Figure 1:
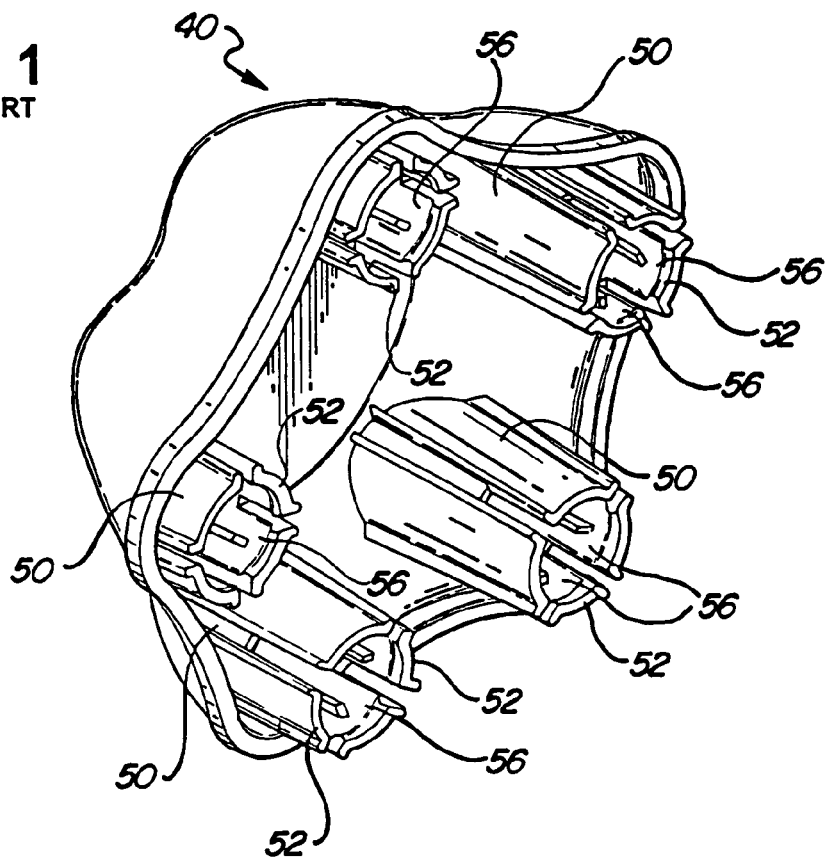
FIG. 1 is a perspective view of the rear of a prior art wheel cover.

Generally shown in the Figures, an ornamental wheel cover assembly integrally retained on the lug nuts of a wheel is shown in accordance with the present invention. In the context of the following detailed description of the preferred embodiment, references to the terms inboard, outboard, front, rear, radial and axial apply to a vehicle component as viewed in the final assembled position unless otherwise specified.

Referring now in detail to the Figures, there is shown in FIG. 6 a wheel cover assembly 100 that is constructed in accordance with a method of the present invention. The wheel cover assembly 100 generally includes a wheel cover 70, and a wire band retainer 90 attached thereto. The wheel cover 70 includes some of the features of a wheel cover 40 described in detail in Hauler et al., U.S. Pat. No. 6,022,081 owned by the assignee hereof and that is incorporated herein by reference in its entirety. For the purpose of clearly understanding the current invention, some limited description of the wheel cover 40 is provided. Furthermore, common features are designated with the reference characters as provided in the Hauler et al. patent wherever possible to maintain continuity.

Figure 2:
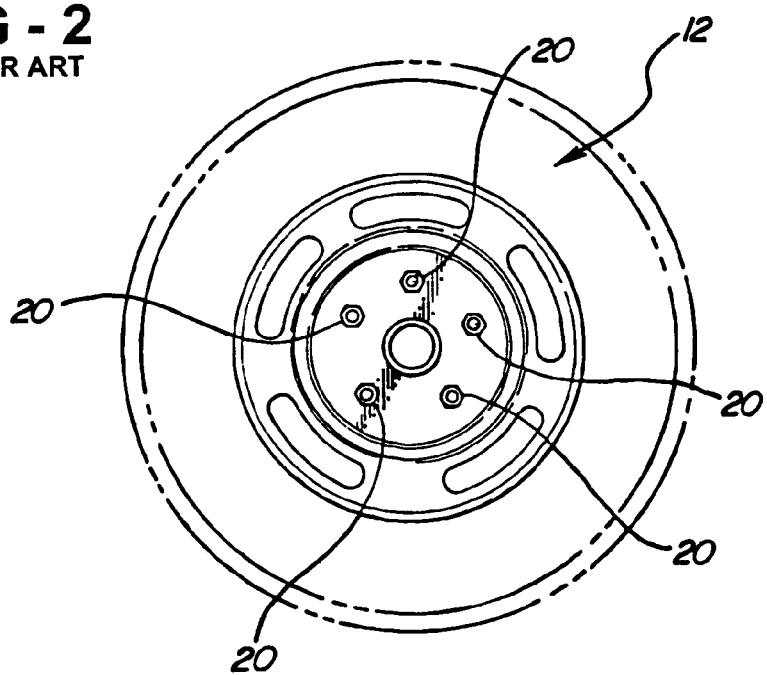
FIG. 2 is a plan view of a prior art wheel and lug nuts to which the prior art wheel cover (not shown) is to be attached.

As best seen in FIGS. 1–3, the wheel cover 40 is integrally retained on lug nuts 20 of a vehicle wheel 12 that provides positive positioning in an inboard/outboard axial direction of the wheel cover 40 to the lug nuts 20. The lug nuts 20 typically have a flange 30 that defines an upper shoulder 32. In the preferred embodiment of FIG. 6, of the present invention, the wheel cover 70 is provided with a number of elongated standoffs or tubular partially slotted extensions 50 axially projecting from the back of the wheel cover 70. The extensions 50 are each partially slotted to provide a plurality of cantilevered fingers 52. The cantilevered fingers 52 are preferably tapered such that the thickness of each cantilevered finger 52 decreases as the cantilevered finger 52 extends axially from the wheel cover 70.

Referring now to FIG. 4, it can be seen that near the end of each cantilevered tapered finger 52 is an undercut groove 56 with a shoulder 56a that defines one end of the undercut groove 56 and a tapered portion 56b defining an opposite end of the undercut groove 56. Each cantilevered tapered finger 52, beyond the undercut groove 56, terminates in a bulbous portion 58. When the wheel cover 40 is attached to the wheel 12, the elongated tubular extensions 50 are aligned with the lug nuts 20 and the wheel cover 40 is moved axially inwardly of the wheel 12 so that the cantilevered fingers 52 separate slightly as their bulbous end portions 58 pass over the lug nut 20 and associated flange 30 until the undercut groove 56 is allowed to snap over the flange 30 of the lug nut 20. Concurrently, the shoulder 56a of the undercut groove 56 will abut against the upper shoulder 32 of the lug nut flange 30, thereby providing a positive axial location of the wheel cover 40 to the wheel 12 and eliminating the effects of tolerance stack-ups of any other surfaces.

As best seen in FIG. 5, the bulbous portion 58 passes over the flange 30 of the lug nut 20 and the tapered portion 56b engages the underside of the flange 30, thereby creating a retention force sufficient to retain the wheel cover 40 on the lug nut 20. The end of the elongated tubular extension 50 is spaced a predetermined distance from the wheel 12 surface and does not contact the wheel 12 surface, such predetermined distance being controlled by the overall length of the lateral elongated standoffs 50, thereby eliminating the possibility of overtravel or interaction with the wheel 12 surface.

Referring now to FIG. 6, the wheel cover 70 of the preferred embodiment includes the features described hereinabove with reference to the wheel cover 40 and further includes a front face 72 having visible decorative features, a rear face 74, and additional support features to locate and retain the wire band retainer 90. The support features of the wheel cover 70 include a plurality of ribs 76, and optionally a second plurality of ribs 77 and/or a plurality of locators 78. The ribs 76, the optional second ribs 77 and the optional locators 78 axially protrude from the rear face 74 of the wheel cover 70. The ribs 76 and the optional locators 78 are disposed between the elongated tubular extensions 50 on a peripheral surface of the rear face 74 of the wheel cover 70. The optional second ribs 77 are disposed on the radial innermost cantilevered fingers 52 of the elongated tubular extensions 50. It should be appreciated by one of ordinary skill in the art that alternate configurations, arrangements and/or combinations of the optional second ribs 77 and locators 78 may be envisioned, and the above disclosure pertaining thereto should not be considered limiting.

Figure 7:
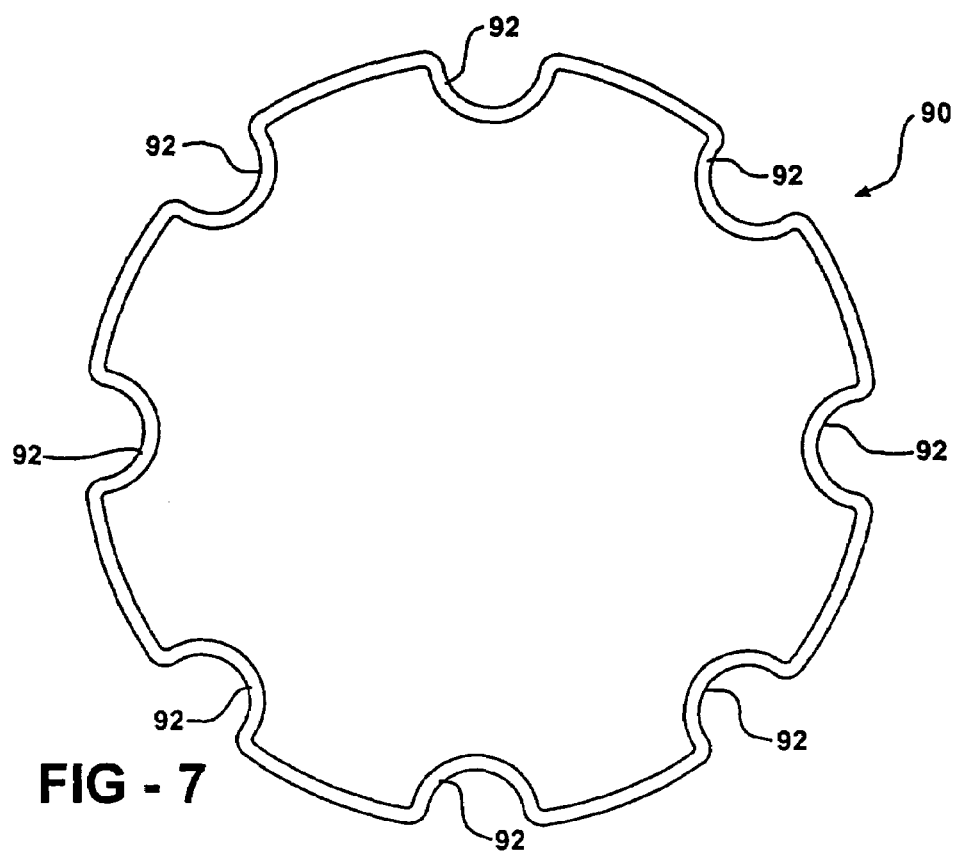
FIG. 7 is a plan view of a wire band retainer.

As best seen in FIGS. 6 and 7, the wire band retainer 90 is preferably composed of a single piece of metal that is formed and welded. The wire band retainer 90 is generally circular and has a plurality of concave sections 92. The ribs 76, the optional second ribs 77 and/or the optional locators 78 position the wire band retainer 90 on the inner diameter of the circle having a perimeter defined by the elongated tubular extensions 50 collectively. After establishing location for the wire band retainer 90, the ribs 76 are adapted to engage and thereby axially retain the wire band retainer 90 as described in more detail below. The plurality of concave sections 92 are designed to align with an are defined by a portion of each elongated tubular extension 50 such that the wire band retainer 90 engages a portion of each elongated tubular extension 50 to bias the corresponding cantilevered tapered fingers 52 and to minimize plastic heat creep.

Figure 8:
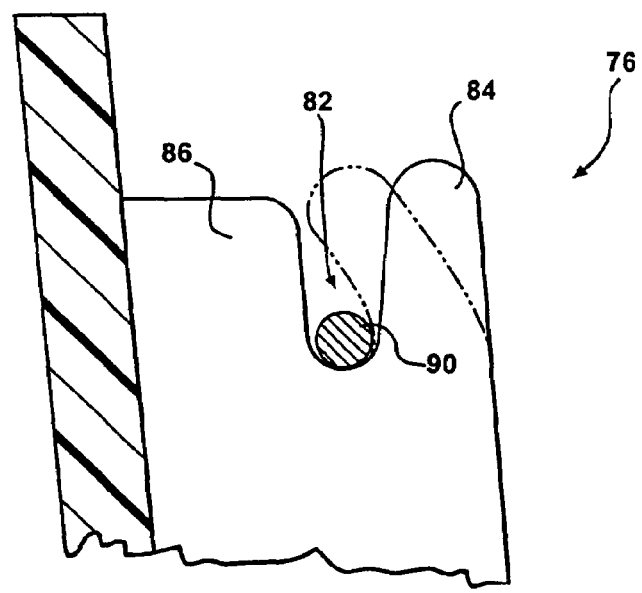
FIG. 8 is an enlarged sectional view of a rib of the wheel cover assembly of FIG. 6.

Referring to FIG. 8, a partial view of one of the ribs 76 is shown in detail. The ribs 76 each include an engagement slot 82, an engagement member 84 and a shoulder 86. The engagement slot 82 is preferably U-shaped and disposed in an innermost axial end of the rib 76 such that the engagement slot 82 defines the engagement member 84 and the shoulder 86. The wire band retainer 90 is assembled to the wheel cover 70 by inserting the wire band retainer 90 into the engagement slot 82 which locates the wire band retainer 90 both radially and axially. After the wire band retainer 90 is disposed within the U-shaped engagement slot 82, the engagement member 84 is plastically deformed in a radially outward direction toward the shoulder 86 to permanently lock the wire band retainer 90 into place. The solid line representation of the engagement member 84 depicts the initial position thereof, while the phantom line representation depicts the deformed position of the engagement member 84 wherein the wire band retainer 90 is locked into place. It should be appreciated by one of ordinary skill in the art that FIG. 8 represents the preferred embodiment, and that there are many other possible configurations for an engagement member 84 adapted to locate and retain the wire band retainer 90.

Referring to FIGS. 6 and 9, an elongated tubular extension 50 of the wheel cover assembly 100 is shown attached to a lug nut 20. The concave sections 92 of the wire band retainer 90 engage only the radial innermost cantilevered tapered fingers 52 of each elongated tubular extension 50. Therefore, the wheel cover assembly 100 is easily attachable and removable because the wire band retainer 90 engages only the innermost cantilevered tapered fingers 52, and is designed to flex a predetermined amount while minimizing plastic heat creep. The remaining unsupported cantilevered tappered fingers 52 also flex sufficiently to attach to and disengage from the lug nuts 20.

The wheel cover assembly 100 advantageously provides two distinct devices, the cantilevered tapered fingers 52 and the wire band retainer 90, acting in conjunction to retain the wheel cover assembly 100 on the lug nuts 20 of the wheel 12 and resulting in a fit that provides significantly improved retention over prior art wheel cover retention systems. Furthermore, many of the shortcomings attributable to conventional plastic retention devices such as poor resistance to heat, relaxation and creep are resolved by the incorporation of the wire band retainer 90.

While the present invention has been described in terms of a preferred embodiment, it is apparent that other forms could be adopted by one skilled in the art. In other words, the teachings of the present invention encompass any reasonable substitutions or equivalents of claim limitations. For example, the structure, materials, sizes, and shapes of the individual components could be modified, or substituted with other similar structure, materials, sizes, and shapes. Those skilled in the art will appreciate that other applications, including those outside of the automotive industry, are possible with this invention. Accordingly, the scope of the present invention is to be limited only by the following claims.

What is claimed is:

1. A method of retaining a wheel cover to a vehicle wheel, said wheel cover adapted to be mounted to a plurality of lug nuts of said vehicle wheel, said method comprising the steps of:
   providing a wheel cover comprising a base having a front face, an oppositely disposed rear face and a central axis, said wheel cover further having a plurality of elongated extensions having an outer surface, an end portion attached to said wheel cover base; and an opposite end extending in a direction away from said rear face, said plurality of elongated extensions being circumferentially spaced about said central axis on said rear face;
   providing a means for biasing at least one of said plurality of extensions on said rear face of said wheel cover base;
   providing a means for retaining on said rear face of said wheel cover base in spaced relation to said plurality of extensions; and
   placing said means for biasing against at least one of said plurality of extensions and into engagement with said means for retaining located on said rear face of said wheel cover base;
   whereby said means for biasing biases at least one of said plurality elongated extensions of said plurality of extensions in a direction towards said lug nuts to maintain engagement with said lug nut when said wheel cover is mounted to said wheel and further whereby said wheel cover is easily removable from said wheel without removing said means from biasing from engagement with said means for retaining.

2. The method of retaining a wheel cover to a wheel as claimed in claim 1 further comprising the step of defining said means for retaining to permanently mount said biasing means to said wheel cover.

3. The method of retaining a wheel cover to a vehicle wheel as claimed in claim 1 wherein each of said plurality of tubular extensions is integrally molded as a part of said wheel cover base.

4. The method of retaining a wheel cover to a vehicle wheel as claimed in claim 1 further comprising the step of placing said plurality of elongated extensions substantially concentric to said central axis of said wheel cover.

\* \* \* \* \*

UNITED STATES PATENT AND TRADEMARK OFFICE
CERTIFICATE OF CORRECTION

| | | |
|---|---|---|
| PATENT NO. | : 7,004,549 B2 | Page 1 of 1 |
| APPLICATION NO. | : 10/725716 | |
| DATED | : February 28, 2006 | |
| INVENTOR(S) | : Garry Van Houten and Lawrence E. O'Toole | |

It is certified that error appears in the above-identified patent and that said Letters Patent is hereby corrected as shown below:

In Column 6, Line 48, kindly delete "are" and insert --arc--.

In Column 8, Line 25, after "plurality" kindly insert --of--.

In Column 8, Line 25, kindly delete "of said plurality of extensions".

Signed and Sealed this

Second Day of January, 2007

JON W. DUDAS
*Director of the United States Patent and Trademark Office*